Karl H. Raab
*Inventor.*

By Karl G. Ross
*Attorney*

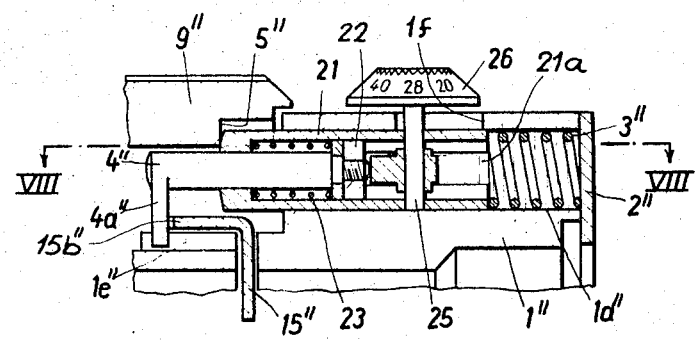
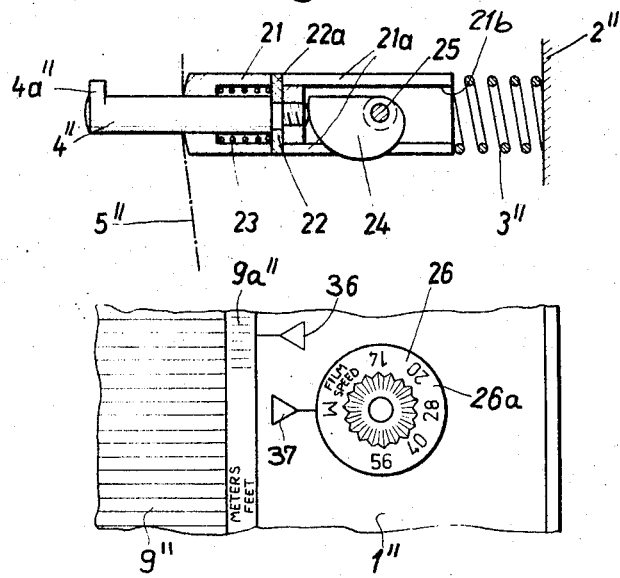

United States Patent Office 3,451,325
Patented June 24, 1969

3,451,325
DIAPHRAGM-STOP PRESELECTOR FOR A
PHOTOGRAPHIC CAMERA
Karl Heinz Raab, Bad Kreuznach, Germany, assignor to Jos. Schneider & Co., Optische Werke, Bad Kreuznach, Germany, a corporation of Germany
Filed Mar. 21, 1966, Ser. No. 536,127
Claims priority, application Germany, Apr. 3, 1965, Sch 36,830
Int. Cl. G03b 9/02
U.S. Cl. 95—64                                     8 Claims

ABSTRACT OF THE DISCLOSURE

A diaphragm-stop preselector has a spring-loaded rod with a lug adapted to intercept different steps of a stepped segment on a diaphragm-control ring. The position of the rod is determined by a rotatable and axially shiftable setting ring, or by a rotatable setting ring together with a seperate cam disk, under the joined control of a distance selector and a sensitivity indicator.

---

The present invention relates to a diaphragm-stop preselector for a camera having an adjustable diaphragm, e.g. of the iris type, which in advance of an exposure is maintained in an extreme (wide-open or substantially closed) position and is momentarily moved into a preselected operating position at the time the picture is taken.

In the case of a camera equipped with a reflex-type viewfinder, for example, it is convenient to maintain the diaphragm in its wide-open position during focusing and to adjust it to a preselected opening size just before the shutter is tripped, advantageously by means of a control mechanism suitably coupled with the usual shutter release. Systems of this description are disclosed, for example, in commonly assigned U.S. Patents 2,981,169 and 3,054,336 issued to K. H. Schütz.

Conversely, there are situations when it will be desirable to keep the diaphragm closed up to the instant of exposure, e.g. when a picture is to be taken with the aid of a flash bulb by a camera whose shutter is not synchronized with the igniter for the flash bulb; in such case the user may close the diaphragm preparatorily to triggering the flash and, just before the bulb fires, may trip the diaphragm control to adjust the size of the stop.

The systems descriped in the above-identified Schütz patents permits only a simple preselection of diaphragm apertures, e.g. as determined by prevailing lighting conditions. Under certain conditions, however, two separate operating variables must be considered to determine the correct setting, e.g. the sensitivity of the emulsion of the photographic film or plate and the brightness of the object to be photographed. In flash-bulb or floodlight photography, the latter factor will depend on the distance of the object from the camera and, therefore, from the illuminating lamp.

The general object of this invention is to provide a diaphragm-stop preselector for the purpose described which is jointly controllable by two independent selectors each having a plurality of positions representing different values of a respective operating variable.

This object is realized, in accordance with the present invention, by the provision of a control element for the diaphragm independently movable along a predetermined path, abutment means displaceable to intercept the control element in different positions of diaphragm adjustment, and setting means with two degrees of freedom responsive to the positions of a first and a second selector means and coupled with the abutment means for arresting same in an intercepting position jointly established by the two selector means.

The setting means determining the point of interception of the diaphragm-control element may include a spring-loaded member, preferably a rod, whose displacement due to spring force is limited by one or more cams. Thus, the spring-loaded rod may bear endwise upon a ring with a frontal camming surface which is rotatable about its axis under the control of one selector means and is axially displaceable under the control of the other selector means, this rotatability and axially mobility representing the two degrees of freedom of the setting means. On the other hand, the camming ring engaged by the rod may have only one degree of freedom, such as that of rotatability about its axis, the other degree of freedom being given to an extension of the rod which is resiliently coupled therewith and displaceable relatively thereto under the control of a further, preferably disk-shaped, cam rotatably journaled on the rod itself.

Means may also be provided for selectively moving the abutment-forming part of the setting member into a non-intercepting position in which, upon concurrent deactivation of the means for automatically displacing the control element for the diaphragm, the latter may be manually moved into any selected stop position to be maintained during exposure.

The invention will be described in greater detail with reference to the accompanying drawings in which:

FIG. 7 is a fragmentary sectional view similar to FIG. 1, showing another embodiment;

FIG. 8 is a top view of part of the mechanism of FIG. 7, taken on the line VIII—VIII thereof but with different relative positioning of the parts; and FIG. 9 is a fragmentary top view of the system shown in FIG. 7, with the same positioning of the parts as in FIG. 8.

Figure 1:
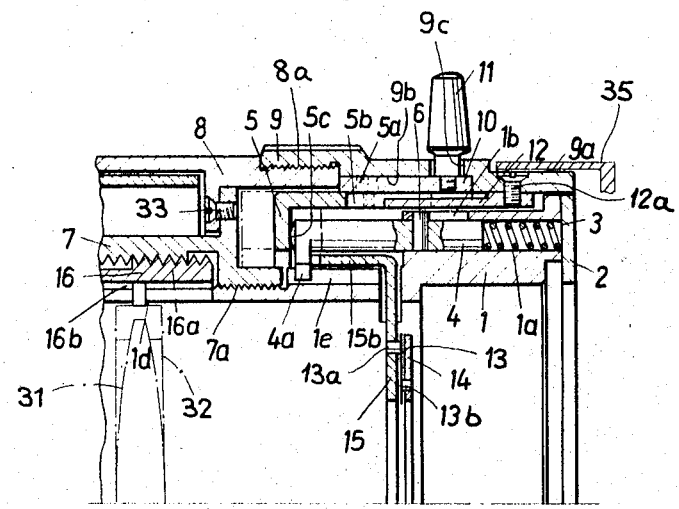
FIG. 1 is a longitudinal section of part of an objective housing for a photographic camera equipped with a diaphragm-stop preselector according to a first embodiment.

Reference will first be made to FIGS. 1–5 in which there is shown at 1 a relatively conventional cylindrical objective housing terminating at its rear in a bayonet ring 2 by which it may be attached to a photographic camera not shown. Housing 1 is provided with an axially extending bore 1a rearwardly obstructed by the ring 2, this bore accommodating a coil spring 3 exerting pressure upon a rod-shaped setting member 4 axially slidable in the bore 1a. A lug 4a, projecting generally transversely from rod 4, bears upon an edge 1c (FIG. 2) of a longitudinal cutout 1e of housing 1 which also has slots 1b, 1d engaging, respectively, by a guide pin 6 in rod 4 and another pin 16b of a threaded ring 16 forming part of a focusing mechanism. A front lens 31 of otherwise unillustrated objective has a mount 32 (both shown in dot-dash lines in FIG. 1) axially shiftable in housing 1 under the control of a focusing ring 7 having threads of large pitch angle in mesh with the threads 16a of ring 16, ring 7 also having threads 7a of small pitch angle engaging the housing 1 while being rigidly secured, by screws 33 (only one shown), to a sleeve 8 which in turn is tightly screwed at 8a into an annular range selector 9. Rotation of the coaxial cylindrical elements 7–9 thus shifts the axial position of front lens 31 to focus the objective, in a manner known per se, upon closer or more remote objects.

Ring 9, representing the range selector, is provided at its rear surface 9a with a distance scale co-operating with a fixed mark on the adjacent camera housing (not shown) to give a reading of the selected range. This ring 9 is undercut at 9b to accommodate a sensitivity-selector ring 10 having an actuating knob 11 which passes radially outwardly through a peripheral slot 9c in ring 9. Ring 10 is formed with a peripheral camming slot 10a, best seen in FIGS. 3 and 5, which receives a stud 5a projecting radially outwardly from a ring 5 whose front face 5c forms a camming surface engaged by the forward end of the spring-loaded rod 4. Ring 5 also has an axially extending peripheral cutout 5b, best seen in FIG. 3, engaged by a lug 12 which is fixedly mounted on ring 9 with the aid of a screw 12a. Ring 5 is thus limitedly rotatable in step with ring 9 and axially displaceable upon rotation of ring 10 as respectively indicated by arrows a and r in FIG. 3.

Figures 2, 3, 6:
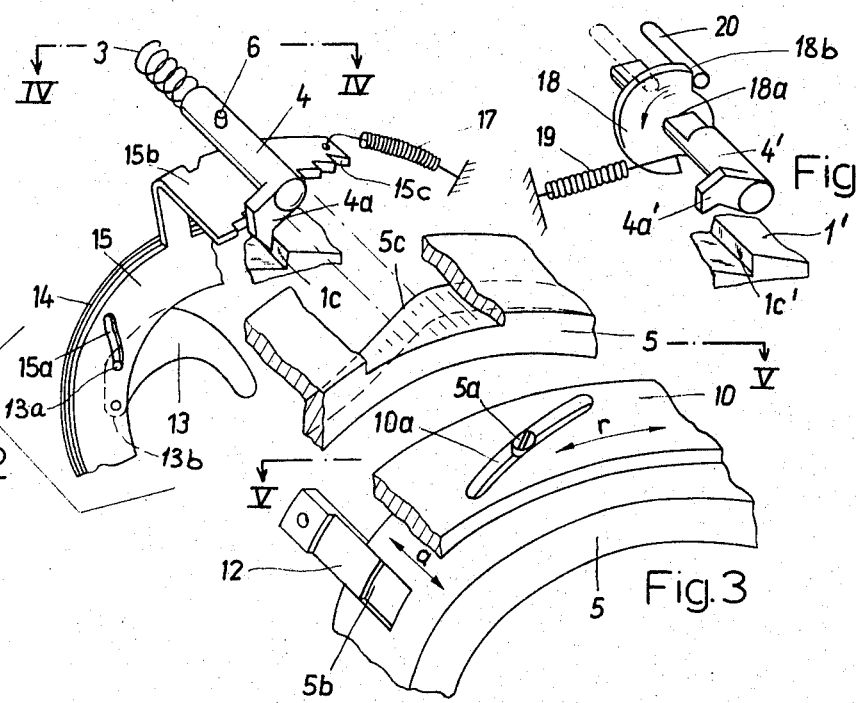
FIG. 2 is an exploded perspective view of certain parts of the mechanism of FIG. 1.
FIG. 3 is a perspective view of other portions of the mechanism shown in FIG. 1.
FIG. 6 is a perspective view similar to part of FIG. 2, illustrating a modification.

A conventional iris diaphragm, carried in the usual manner on a fixed lens mount (not shown) of the objective, has been represented in FIGS. 1 and 2 by a set of iris leaves 13 bracketed between two relatively rotatable rings, i.e. a fixed mounting ring 14 and a rotatable setting ring 15 provided with an integral extension 15b; the movement of the iris leaves 13 is controlled in the usual manner by camming slots 15a in the ring 15, one of these slots being visible in FIG. 2 and accommodating a pin 13a of a leaf 13 also provided with a stud 13b by which it is pivoted on ring 14. Extension 15b of ring 15 has a stepped profile 15c, the lug 4a of rod 4 being selectively alignable with any of the steps of this profile to arrest the ring 15 in a selected stop position when this ring is swung clockwise, as viewed in FIG. 2, under the control of a contractile spring 17. Prior to the taking of a picture, ring 15 is held in a withdrawn position (full lines, FIG. 4) of maximum diaphragm opening by means of a latch 34 engaging in a notch 15d of bracket 15b. When the shutter-release button (not shown) of the camera is pressed, and just before the delayed ignition of a flash bulb induced by this operation, latch 34 is withdrawn so that spring 17 pulls the bracket 15b into an operating position (dot-dash) lines determined by the engagement of one of its steps 15c with the lug 4a.

Figure 4:
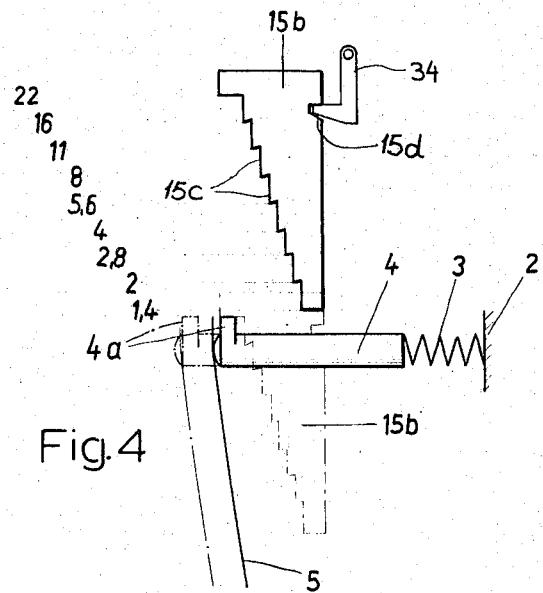
FIG. 4 is a somewhat diagrammatic top view taken on the line IV—IV of FIG. 2.
Figure 5:
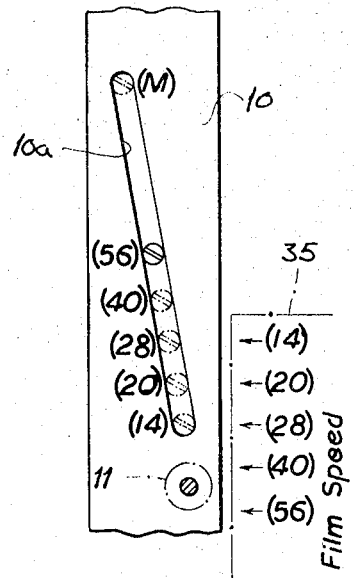
FIG. 5 is a similar view taken on the line V—V of FIG. 3.

The position of rod 4 and lug 4a at the moment of unlatching of diaphragm ring 15, and therefore the selected size of the diaphragm aperture, is co-determined by the setting of range-selecting ring 9 and sensitivity-indicating knob 11; the positions of this knob can be read on a stationary scale member 35, carried by the camera, as diagrammatically indicated in FIG. 5 where the plate or film speed corresponding to these different positions has been given, by way of example, in degrees Scheiner. An angular displacement of the knob 11 and, with it, of ring 10 cams the ring 5 in an axial direction (a) whereas a turning of ring rotatably entrains the ring 5 through the intermediary of tongue 12, both movements together determining the extent to which the camming surface 5c on ring 5 allows the setting rod 5 to be pushed forwardly by its biasing spring 3. It should be noted that knob 11 also has an extreme position, designated M (for "manual"), in which lug 4a is allowed to move sufficiently far to the left (dot-dash lines, FIG. 4) to be out of the path of profiled bracket 15b so that the diaphragm-setting ring 15 may be manually moved, upon suitable decoupling from its spring 17, into any desired position; the extent of the swing of ring 5 under the control of ring 9 is insufficient to realign movable lug 4a with any of the steps 15c once the knob 5 has been placed in position M.

In FIG. 6 there has been a modified setting rod 4' which, in addition to being axially shiftable under the control of a spring 3 and a camming surface 5c as previously described, is also swingable about its own axis for the purpose of lifting its lug 4a' out of the path of the profiled segment 15b (FIGS. 2 and 4). For this purpose the rod 4' has a flattened shank fitting into a complementary hole 18a of a disk 18 which is biased in a clockwise direction by a spring 19 urging a shoulder 18b thereof into contact with a transversely movable pin 20. This pin, projecting forwardly from the camera body (not shown), in its full-line position allows the lug 4a' to swing away from its contact edge 1c' so that the segment 15b can move freely between housing 1' and rod 4'. When the user manually shifts the pin 20 into its alternate position shown in dot-dash lines, thereby rotating the disk 18 and the rod 4' counterclockwise as indicated by the arrow, lug 4a' engages the edge 1c' and the system operates in the same manner as that of FIGS. 1–5, except that the camming slot 10a thereof may be considerably shortened since the position M is no longer needed.

FIGS. 7–9 show a different embodiment in which elements corresponding to those of the preceding figures have been designated by the same reference numerals with the addition of a double prime. In this system the focusing ring or range selector 9" has been relocated toward the front of housing 1" and carries a distance scale 9a" co-operating with a fixed pointer 36 on the housing. Ring 9" also has a frontal camming surface 5" limiting the forward displacement of a rod 21 under the control of spring 3". Journaled in this rod, with the aid of a transverse pin 25, is a cam disk 24 which can be manually rotated by means of a knob 26, this knob bearing a film-speed or sensitivity scale 26a co-operating with a fixed mark 37 on housing 1". Knob 26 is mounted on an outwardly projecting extremity of pin 25 passing through a longitudinal slot 1f of the housing.

Rod 21 has a central bore 21b and a pair of diametrically opposite longitudinal wall slots 21a which give passage to the disk 24 and also accommodate radial projections 22a on a disk 22 which is screwed onto the rear end of an extension rod 4" telescoped in rod 21. Rod 4", which corresponds to rods 4 and 4' of the preceding figures in serving as a carrier for a lug 4a" positionable to intercept a stepped segment 15b" of a diaphragm-setting ring 15", is urged rearwardly with reference to rod 21 by a compression spring 23 bearing upon the disk 22. The extent of this relative axial displacement of the two rods 4" and 21 is limited by the cam disk 24 and depends on the setting given to knob 26.

In the embodiment of FIGS. 7–9, therefore, the axial position of lug 4a" is also jointly controlled by two selectors, i.e. focusing ring 9" and sensitivity-registering knob 26. This knob, as shown in FIG. 9, has a special position M which corresponds to the similarly designated position (FIG. 5) of knob 11 and designates a position of cam 24 which shifts the rod 4" sufficiently far to the left, relatively to rod 21 as viewed in FIG. 7, that lug 4a" will be decoupled from segment 15b" regardless of the position of camming surface 5" of ring 9".

The arrangement of FIGS. 7–9 will be particularly useful where the ring 9" forms part of one of several lens attachments adapted to be interchangeably mounted on the housing 1".

I claim:
1. A diaphragm-stop preselector for a camera having an adjustable diaphragm, comprising:
    first selector means having a plurality of positions representing different values of a first operating variable affecting the choice of diaphragm opening;
    second selector means having a plurality of positions representing different values of a second operating variable affecting the choice of diaphragm opening;
    a control element for said diaphragm independently movable along a predetermined path;
    abutment means displaceable to intercept said control element in different positions of adjustment of said diaphragm;
    and setting means with two degrees of freedom respon- sive to the positions of said first and second selector means and coupled with said abutment means for arresting same in an intercepting position jointly established by both said selector means; said setting means comprising a spring-loaded member and cam means coupled with said first and second selector means for limiting a displacement of said member due to spring force, said cam means including a ring with a frontal camming surface contacted by an end of said member, the latter being axially movable by said spring force with reference to said ring.

2. A preselector as defined in claim 1 wherein said setting means is additionally movable, under the control of said first selector means, into a non-intercepting position.

3. A preselector as defined in claim 1 wherein said first selector means is a manually settable sensitivity indicator.

4. A preselector as defined in claim 3 wherein said second selector means is a distance selector.

5. A preselector as defined in claim 1 wherein one of said selector means is a distance selector coupled with a focusing mechanism.

6. A preselector as defined in claim 1 wherein said ring is axially shiftable under the control of said first selector means and rotatable about its axis under the control of said second selector means.

7. A preselector as defined in claim 1 wherein said member is provided with an extension resiliently coupled therewith and bearing said abutment means, said cam means including a disk rotatably journaled on said member and bearing upon said extension for displacing same relatively to said member under the control of said first selector means, said ring being rotatable about its axis under the control of said second selector means.

8. A preselector as defined in claim 1 wherein said member is a rod, said abutment means forming a generally transverse lug on said rod, further comprising means for rotating said rod about its own axis into an attitude removing said lug from the path of said control element irrespectively of the axial position of said rod.

References Cited

UNITED STATES PATENTS

| | | | |
|---|---|---|---|
| 2,981,169 | 4/1961 | Schutz | 95—64 |
| 2,986,981 | 6/1961 | Planert et al. | 95—64 XR |
| 3,081,680 | 3/1963 | Goshima | 95—42 |
| 3,228,314 | 1/1966 | Koppen | 95—44 XR |

FOREIGN PATENTS 607,158 8/1960 Italy.

NORTON ANSHER, *Primary Examiner.*

JOSEPH F. PETERS, JR., *Assistant Examiner.*

U.S. Cl. X.R.

95—44